US011035822B2

(12) United States Patent
Staley et al.

(10) Patent No.: US 11,035,822 B2
(45) Date of Patent: Jun. 15, 2021

(54) PH SENSING METHOD BASED UPON THE POTENTIAL DIFFERENCE BETWEEN TWO ELECTROCHEMICAL WAVES

(71) Applicant: Robert Bosch GmbH, Stuttgart (DE)

(72) Inventors: Patrick Staley, Sunnyvale, CA (US); Nadezda Fomina, Redwood, CA (US); Murat Deliomeroglu, Mountain View, CA (US); Christopher Johnson, San Carlos, CA (US); Young Shik Shin, Mountain View, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 229 days.

(21) Appl. No.: 16/123,096

(22) Filed: Sep. 6, 2018

(65) Prior Publication Data

US 2020/0080964 A1 Mar. 12, 2020

(51) Int. Cl.
*G01N 27/30* (2006.01)
*G01N 27/416* (2006.01)

(52) U.S. Cl.
CPC ....... *G01N 27/4167* (2013.01); *G01N 27/302* (2013.01); *G01N 27/4163* (2013.01); *G01N 27/308* (2013.01)

(58) Field of Classification Search
None
See application file for complete search history.

(56) References Cited

U.S. PATENT DOCUMENTS

| 5,223,117 | A | * | 6/1993 | Wrighton | B82Y 15/00 |
| | | | | | 204/415 |
| 5,271,820 | A | | 12/1993 | Kinlen et al. | |
| 7,837,847 | B2 | | 11/2010 | Feng et al. | |
| 8,262,878 | B2 | | 9/2012 | Wolf et al. | |
| 8,956,519 | B2 | | 2/2015 | Leonard et al. | |
| 9,347,907 | B2 | | 5/2016 | Duimstra et al. | |
| 2008/0023328 | A1 | * | 1/2008 | Jiang | G01N 27/308 |
| | | | | | 204/407 |
| 2011/0162977 | A1 | * | 7/2011 | Lafitte | G01N 27/48 |
| | | | | | 205/775 |

OTHER PUBLICATIONS

K. S. Johnson et al., "Deep-Sea DuraFET: A Pressure Tolerant pH Sensor Designed for Global Sensor Networks," Analytical Chemistry (2016) vol. 88, 3249-56.

(Continued)

*Primary Examiner* — J. Christopher Ball
(74) *Attorney, Agent, or Firm* — Norton Rose Fulbright US LLP; Gerard Messina

(57) ABSTRACT

A sensor and a corresponding method measure the pH of a solution without using an external reference electrode. The pH sensor has at least one functionalized electrode with an attached first redox active molecule and an attached second redox active molecule that are differently sensitive to pH and oxidize/reduce at different voltages, and a difference in peaks of a response of the two molecules to applied electrical parameter is measured and correlated to a particular pH.

13 Claims, 5 Drawing Sheets
(1 of 5 Drawing Sheet(s) Filed in Color)

(56) References Cited

OTHER PUBLICATIONS

Kato et al., "Supramolecular Assemblies and Redox Modulation of Pyromellitic Diimide-Based Cyclophane via Noncovalent Interactions with Naphthol1," Journal of Organic Chemistry, (2006), vol. 71, issue 13, 4723-33.
Chen et al., "Molecular Binding Behaviors of Pyromellitic and Naphthalene Diimide Derivatives by Tetrasolfonated 1,5-Dinaphtho-(3n+8)-crown-n (n=8, 10) in Aqueous Solution," Journal of Organic Chemistry, (2013) vol. 78, issue 11, 5357-63.
Garza et al., "Theoretical and Electrochemical Study of the Quinone-Benzoic Acid Adduct Linked by Hydrogen Bonds," Journal of Physical Chemistry A, (2003), vol. 107, issue 50, 11161-68.
Chen and Peng, "The electrochemical properties of dopamine, epinephrine, noreinephrine, and their electrocatalytic reactions on cobalt(II) hexacyanoferrate films," Journal of Electroanalytical Chemistry (2003) vol. 547, issue 2, 179-189.
Hui et al., "Voltammetric Method for Determining the Trace Moisture Content of Organic Solvents Based on Hydrogen-Bonding Interactions with Quinones," Analytical Chemistry, (2010) vol. 82, issue 5, 1928-34.
Siddiqui et al., "Analytical techniques in pharmaceutical analysis: A review," Arabian Journal of Chemistry (2017) vol. 10, S1409-S1421.
Arduini et al., "Electrochemical biosensors based on nanomodified screen-printed electrodes: Recent applications in clinical analysis," Trends in Analytical Chemistry (2016), vol. 79, 114-126.
Fomina et al., "An electrochemical platform for localized pH control on demand," Lab on a Chip (2016) vol. 16, 2236-44.

* cited by examiner

PH SENSING METHOD BASED UPON THE POTENTIAL DIFFERENCE BETWEEN TWO ELECTROCHEMICAL WAVES

TECHNICAL FIELD

Aspects of the present invention relate to a pH sensor that can measure the pH of a solution without using an external reference electrode, by measuring two oxidation-reduction reactions on the same electrode. Aspects of the invention also relate to methods of calibrating such a pH sensor and using such a pH sensor to measure the pH of a solution.

BACKGROUND

The measurement of the acidity or basicity (pH) of a solution has wide application to science and engineering generally. For example, the pH of wet soil is relevant to agriculture, ecological studies and conservation, and the engineering of structures that are to be built in or on that soil. The pH of natural water is relevant to drinking water sanitation, marine ecological studies and conservation, and the engineering of boats or piping that is supposed to interact with these systems. The pH of biological samples is relevant to scientific research in fields as diverse as ink chemistry and biological separations, as well as the fields of medical diagnostics and prognostics.

pH sensors are normally electrochemical devices that interact with the $H_3O^+$ ions in a solution and produce either a potential change or an impedance change. Currently, measuring the pH of solutions is based upon either the measurement of the open circuit potential of an oxidation-reduction (redox) couple that changes based upon interaction with the acid or base (i.e., protonation or deprotonation) or of the electric potential of the redox couple through cyclic voltammetry, or the measurement of the gate voltage of a dielectric whose gate voltage changes with protonation or deprotonation. In either case, a minimum of one "working" electrode (i.e., the electrode that, in this case, is functionalized with or in contact with the redox couple and the solution being tested), and one "reference" electrode (i.e., the electrode that is in contact with the solution being tested but maintains a constant electric potential) are required.

Methods that use open circuit potential measurements typically use glass (see U.S. Pat. No. 7,837,847), metal oxides (for example, iridium oxide, see U.S. Pat. No. 5,271,820), or antimony (see U.S. Pat. No. 8,262,878) to interact with the solution being tested. In these cases, the redox couples used by the working electrode to determine pH are protonated versus deprotonated glass, iridium(III) oxide versus iridium(IV) oxide, and antimony(III) versus antimony(0). The reference electrode is normally a saturated calomel electrode or silver/silver chloride electrode, which is also the "counter" electrode (i.e., the electrode that works with the working electrode as a pair in order to balance its excess charge when current flows).

For methods that use cyclic voltammetry, the working electrode is typically functionalized with organic (see U.S. Pat. No. 8,956,519) or organometallic (see U.S. Pat. No. 9,347,907) redox couples whose potentials are affected by the pH of the solution. The potential at which the redox couples undergo oxidation and/or reduction is measured relative to the potential of the reference electrode, and the amount of shift from a standard condition determines the pH. For this design, a separate counter electrode is included so that current does not go through the reference electrode and thus change the reference potential.

For methods involving the measurement of the gate potential of a semiconductor (called ion selective field effect transistor (IS-FET) devices), a potential is applied across a semiconductor material which is also in contact with the target solution, either directly or through a conductor that leads to an ion selective dielectric or ion selective semiconductor. The current that is allowed across the first semiconductor is measured to determine the change in its gate potential as a result of protonation/deprotonation reactions. See K. S. Johnson et al., "Deep-Sea DuraFET: A Pressure Tolerant pH Sensor Designed for Global Sensor Networks," Analytical Chemistry (2016) vol. 88, 3249-56. IS-FET devices differ in that electric current allowed through the IS-FET device is what is directly measured, rather than electric potential.

For the following systems, the difference in the electric potentials between two redox waves has been shown to change depending upon the concentration of a hydrogen bonding partner: diimides in the presence of phenols (see Kato et al., "Supramolecular Assemblies and Redox Modulation of Pyromellitic Diimide-Based Cyclophane via Non-covalent Interactions with Naphthol 1," Journal of Organic Chemistry, (2006), vol. 71, iss. 13, 4723-33; see also Chen et al., "Molecular Binding Behaviors of Pyromellitic and Naphthalene Diimide Derivatives by Tetrasolfonated 1,5-Dinaphtho-(3n+8)-crown-n (n=8, 10) in Aqueous Solution," Journal of Organic Chemistry, (2013) vol. 78, issue 11, 5357-63), hydroquinones in the presence of benzoate (see Garza et al., "Theoretical and Electrochemical Study of the Quinone-Benzoic Acid Adduct Linked by Hydrogen Bonds," Journal of Physical Chemistry A, (2003), vol. 107, issue 50, 11161-68), and quinones in the presence of water (see Hui et al., "Voltammetric Method for Determining the Trace Moisture Content of Organic Solvents Based on Hydrogen-Bonding Interactions with Quinones," Analytical Chemistry, (2010) vol. 82, issue 5, 1928-34), with the latter couple used as a method to determine the concentration of water in organic liquids. At the same time, the concentrations of hydronium and hydroxide (the products of reaction between acids and water or bases and water, respectively) have been shown to influence the redox potential of organic molecules. See Chen and Peng, "The electrochemical properties of dopamine, epinephrine, norepinephrine, and their electrocatalytic reactions on cobalt(II) hexacyanoferrate films," Journal of Electroanalytical Chemistry (2003) vol. 547, issue 2, 179-189.

SUMMARY

A summary of certain example embodiments of the present invention is set forth below. It should be understood that these aspects are presented merely to provide the reader with a brief summary of these certain embodiments and that these aspects are not intended to limit the scope of the present invention. Indeed, this invention can encompass a variety of aspects that may not be set forth below.

Example embodiments of the present invention provide a device that can measure the pH of a solution without using an external reference electrode. The device measures two oxidation-reduction (redox) reactions on the same working electrode that are differently sensitive to pH or to water concentration. The difference between the potentials of the two redox reactions is correlated to the pH of the solution via a calibration curve. According to example embodiments, the potential changes can be induced by two redox reactions associated with the same molecule (for example, diimides) or with two or more molecules (for example, a ferrocyanide derivative and a naphthol derivative, or a ferrocene derivative and anthraphenol derivative), but in any case the redox couples are adsorbed or covalently bound onto the same electrode.

Since the pH measurement is based on the potential difference of two redox reactions—of two electrochemical sensitizers—on the surface of the same electrode, rather than the difference of one electrode versus a reference electrode, an external reference electrode is not needed. Eliminating the need for a reference electrode allows greater design flexibility, since the counter electrode of the two electrode setup does not need to act as a reference and can thus be made from a wider range of materials. Such a device can be useful in microfluidic or microarray devices, where incorporation of a reference electrode can be challenging due to fabrication constraints.

Another advantage is that pH measurements can be performed directly on the surface of the working electrode, which could have a different primary function, such as analyte detection in electrochemical sensors (by voltammetric stripping, impedance measurement, or electrolysis/ampomeric detection) (see Siddiqui et al., "Analytical techniques in pharmaceutical analysis: A review," Arabian Journal of Chemistry (2017) vol. 10, S1409-S1421; see also Arduini et al., "Electrochemical biosensors based on nano-modified screen-printed electrodes: Recent applications in clinical analysis," Trends in Analytical Chemistry (2016), vol. 79, 114-126), or pH modulation (see Fomina et al., "An electrochemical platform for localized pH control on demand," Lab on a Chip (2016) vol. 16, 2236-44).

The electrode used for pH sensing can also be used for other experiments by separating the measurements in time, and possibly in space. If, for example, the pH measurement is desired during an electrolysis/amperometric measurement of a product produced in an ELISA assay, then a full cyclic voltammogram can be performed at a high speed at regular times in order to perform the 2-wave pH measurement, with the rest of the time dedicated to the ELISA assay. Since the pH sensitizer(s) is/are bound to the electrode surface, their redox signal would increase as compared to chemical species that have to diffuse onto the electrode. The sensitizer(s) can also be bound to a small area of the electrode, allowing space for other target species to react and be detected. Unlike pH detection methods that measure the open circuit potential of a redox couple relative to a reference, the time needed to take the pH measurements on this device will depend upon the voltammetric scan rate rather than the time needed to diffuse through mesoporous and microporous structures and then reach chemical equilibrium (including intercalation).

According to an example embodiment of the present invention, there is provided a pH sensor that includes: (a) at least one functionalized electrode; (b) at least one other electrode; and (c) at least one redox molecule attached to the at least one functionalized electrode, where the at least one functionalized electrode and the at least one other electrode are connected by application thereto of a solution, where the at least one redox molecule has at least a first redox potential that is dependent on and changes with pH level, and where the at least one redox molecule produces at a same pH level a first redox reaction and a second redox reaction on the at least one functionalized electrode, each reaction having a different redox potential at the same pH level.

In some example embodiments, the at least one functionalized electrode and the at least one other electrode are made of titanium, gold, platinum, boron doped diamond, glassy carbon, graphite, amorphous carbon, doped silicon, fluorine doped tin oxide, indium tin oxide, or a conducting polymer.

In some example embodiments, the at least one redox molecule has a second redox potential, where the first redox potential and the second redox potential are differently sensitive to pH level and oxidize at different voltages, where the first redox potential produces the first redox reaction, and where the second redox potential produces the second redox reaction.

In some example embodiments, the pH sensor further includes a second redox molecule attached to the at least one functionalized electrode, where the second redox molecule has a second redox potential, where the first redox potential and the second redox potential are differently sensitive to pH level and oxidize at different voltages, where the first redox potential produces the first redox reaction, and where the second redox potential produces the second redox reaction.

In some example embodiments, the second redox potential is not dependent on and does not change with pH level.

In some example embodiments, the second redox potential is dependent on and changes with pH level.

According to an example embodiment of the present invention, there is provided a method of calibrating a pH sensor that includes: (a) at least one functionalized electrode; (b) at least one other electrode; and (c) at least one redox molecule attached to the at least one functionalized electrode, where the at least one functionalized electrode and the at least one other electrode are connected by application thereto of a solution, where the at least one redox molecule has at least a first redox potential that is dependent on and changes with pH level, and where the at least one redox molecule produces at a same pH level a first redox reaction and a second redox reaction on the at least one functionalized electrode, each reaction having a different redox potential at the same pH level, the method including: (1) at a first pH level, obtaining a voltammetric scan with a first peak corresponding to the first redox reaction and a first peak corresponding to the second redox reaction; (2) at a second pH level, obtaining a voltammetric scan with a second peak corresponding to the first redox reaction and a second peak corresponding to the second redox reaction; (3) plotting a first point that corresponds to the first pH level and a difference between the first peak corresponding to the first redox reaction and the first peak corresponding to the second redox reaction; (4) plotting a second point that corresponds to the second pH level and a difference between the second peak corresponding to the first redox reaction and the second peak corresponding to the second redox reaction; and (5) obtaining a line of best fit through the plotted points.

According to an example embodiment of the present invention, there is provided a method of measuring a pH level of an unknown solution using a pH sensor that includes: (a) at least one functionalized electrode; (b) at least one other electrode; and (c) at least one redox molecule attached to the at least one functionalized electrode, where the at least one redox molecule has at least a first redox potential that is dependent on and changes with pH level, and where the at least one redox molecule produces at a same pH level a first redox reaction and a second redox reaction on the at least one functionalized electrode, each reaction having a different redox potential at the same pH level, the method including: (1) applying the pH sensor to the unknown solution, thereby connecting the at least one functionalized electrode and the at least one other electrode; (2) obtaining a voltammetric scan with a peak corresponding to the first redox reaction and a peak corresponding to the second redox reaction; (3) finding a difference between the peak corresponding to the first redox reaction and the peak corresponding to the second redox reaction; and (4) using a pre-determined calibration curve, finding the pH level corresponding to the difference between the peak corresponding to the first redox reaction and the peak corresponding to the second redox reaction.

In some example embodiments, the peak corresponding to the first redox reaction and the peak corresponding to the second redox reaction are anodic peaks.

In some example embodiments, the peak corresponding to the first redox reaction and the peak corresponding to the second redox reaction are cathodic peaks.

In some example embodiments, the voltammetric scan is a linear sweep voltammogram, a cyclic voltammogram, a differential pulse voltammogram, or a square wave voltammogram.

According to an example embodiment of the present invention, there is provided a pH sensor that includes: (a) at least one electrode; (b) at least one redox molecule attached to the at least one electrode; (c) a voltage source; and (d) a processor, where the at least one redox molecule has at least a first redox potential that is dependent on and changes with pH level, where the at least one redox molecule produces at a same pH level a first redox reaction and a second redox reaction on the electrode, each reaction having a different redox potential at the same pH level, and where the processor is configured to: apply varying amounts of voltage from the voltage source to the at least one electrode; obtain a voltammetric scan with a peak corresponding to the first redox reaction and a peak corresponding to the second redox reaction; find a difference between the peak corresponding to the first redox reaction and the peak corresponding to the second redox reaction; find, in a pre-determined calibration curve, the pH level corresponding to the difference between the peak corresponding to the first redox reaction and the peak corresponding to the second redox reaction; and output the pH level to an output device.

An example embodiment of the present invention is directed to a pH sensor. The pH sensor includes at least one functionalized electrode, at least one other electrode, and a redox pair that includes a first redox component and a second redox component (the two components can be two components of a same molecule or can be two molecules). The at least one functionalized electrode and the at least one other electrode are connected by application thereto of a solution. The redox pair is attached to the at least one functionalized electrode. The first redox component has a redox potential that is dependent on pH, having one redox potential at one pH level and a second redox potential at a second pH level. The first redox component and the second redox component are differently sensitive to pH and oxidize at different voltages.

In an example, the second redox component has a redox potential that is not dependent on pH.

In an example, the second redox component has a redox potential that is dependent on pH, having one redox potential at one pH level and a second redox potential at a second pH level.

In an example, the at least one functionalized electrode and the at least one other electrode are made of titanium, gold, platinum, boron doped diamond, glassy carbon, graphite, amorphous carbon, doped silicon, fluorine doped tin oxide, indium tin oxide, or a conducting polymer.

In an example, the sensor further includes a redox compound attached to the at least one functionalized electrode, wherein the redox pair is attached to the redox compound.

In an example, the sensor further includes a first redox compound attached to the at least one functionalized electrode and a second redox compound attached to the at least one functionalized electrode separately from the first redox compound, where the first redox component is attached to the first redox compound, and the second redox component is attached to the second redox compound.

An example embodiment of the present invention is directed to a method of calibrating a pH sensor as described above. The method includes, at a first pH level, obtaining a voltammetric scan with a first peak of the first redox component and a first peak of the second redox component; at a second pH level, obtaining a voltammetric scan with a second peak of the first redox component and a second peak of the second redox component; plotting a first point that corresponds to the first pH level and a difference between the first peak of the first redox component and the first peak of the second redox component; plotting a second point that corresponds to the second pH level and a difference between the second peak of the first redox component and the second peak of the second redox component; and obtaining a line of best fit through the plotted points.

An example embodiment of the present invention is directed to a method of measuring a pH level of an unknown solution using a pH sensor, wherein the pH sensor includes a first redox component that has a redox potential that is dependent on pH such that the redox potential of the first redox component is different at different pH levels of the solution, a second redox component, a functionalized electrode to which the first and second redox components are attached, and a non-functionalized electrode, wherein the first and second redox components are differently sensitive to pH. The method includes: applying the pH sensor to the unknown solution; obtaining a voltammetric scan with a peak of the first redox molecule and a peak of the second redox component; finding a difference between the peak of the first redox component and the peak of the second redox component; and finding, in a pre-determined calibration curve, the pH level corresponding to the difference between the peak of the first redox component and the peak of the second redox component. In an example, the peak of the first redox component and the peak of the second redox component correspond to anodic peaks. In an example, the peak of the first redox component and the peak of the second redox component correspond to cathodic peaks. In an example, the voltammetric scan is a linear sweep voltammogram, a cyclic voltammogram, a differential pulse voltammogram, or a square wave voltammogram.

An example embodiment of the present invention is directed to a pH sensor that includes: an electrode; a redox pair attached to the electrode and including a first redox component and a second redox component; a voltage source; and a processor. The first redox component has a redox potential that is dependent on pH such that the first redox component has a first redox potential at one pH level and a second different redox potential at a second pH level. The first redox component and the second redox component are differently sensitive to pH and oxidize at different voltages. The processor is configured to: apply varying amounts of voltage from the voltage source to the electrode; obtain a voltammetric scan with a peak of the first redox component and a peak of the second redox component; determine a difference between the peak of the first redox component and the peak of the second redox component; identify a pH level for which a predefined calibration curve defines the difference between the peak of the first redox component and the peak of the second redox component; and output the identified pH level to an output device.

The details of one or more embodiments of the invention are set forth in the accompanying drawings and the description below. Other features, aspects, and advantages of the invention will be apparent from the description and drawings, in which like characters represent like parts throughout the drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

The following description is not to be taken in a limiting sense, but is made for the purpose of illustrating the general principles of the invention. Various inventive features are described below that can each be used independently of one another or in combination with other features.

Broadly, this disclosure is directed at determining the pH of a solution by measuring the difference in electric potential between two redox waves either associated with the same molecule or with two different molecules that interact with hydronium and hydroxide by hydrogen bonding.

Figure 1A:
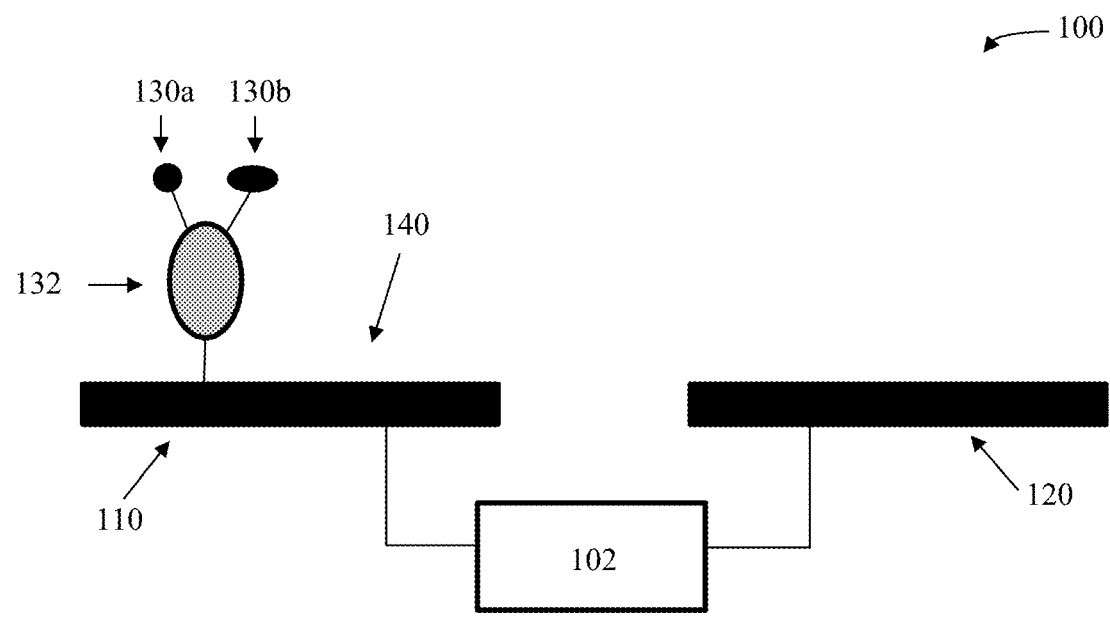
FIG. 1A illustrates a pH sensor according to an example embodiment of the present invention.
Figure 1B:
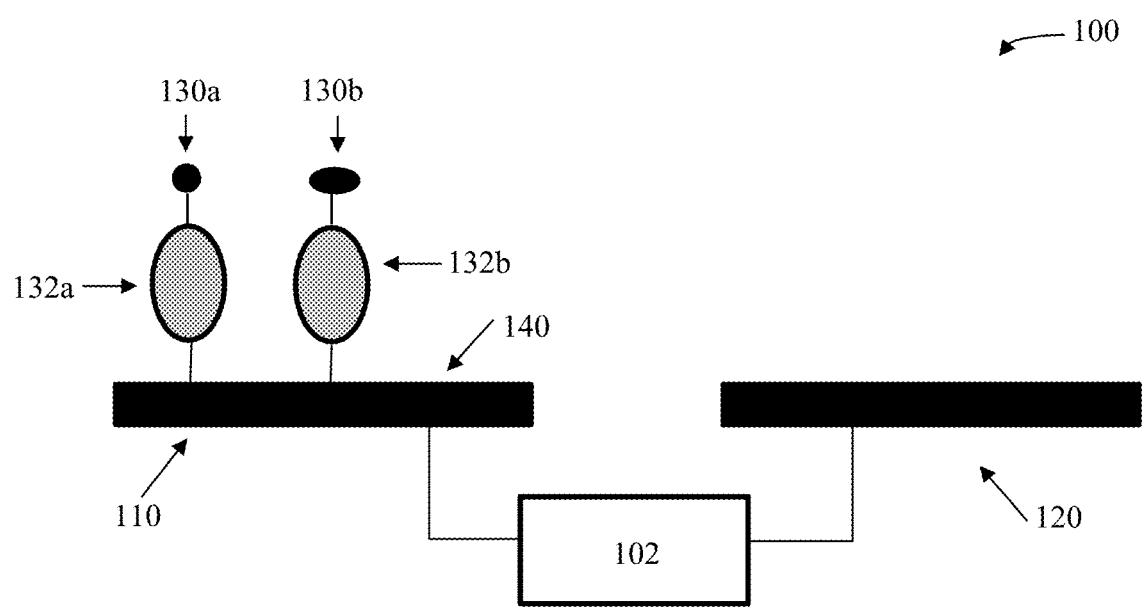
FIG. 1B illustrate a pH sensor according to another example embodiment of the present invention.

As shown in FIGS. 1A and 1B, pH sensor 100 has functionalized electrode 110 and other electrode 120. A solution is applied to functionalized electrode 110 and other electrode 120, thereby connecting functionalized electrode 110 and other electrode 120. Functionalized electrode 110 and other electrode 120 are also connected through a device, such as processor 102, which controls the application of a voltage from a voltage source and thus the voltage difference, and which is arranged for receiving a signal representing a measure of the resulting current. As shown in FIG. 1A, functionalized electrode 110 is functionalized with at least one redox molecule 132 that has attached redox component 130a and redox component 130b, each of which has a redox potential that is pH-dependent. As shown in FIG. 1B, functionalized electrode 110 is functionalized with at least two redox molecules 132a and 132b, where each of redox components 130a and 130b is attached to a separate redox molecule—in FIG. 1B, redox component 130a is attached to redox molecule 132a while redox component 130b is attached to redox molecule 132b. Functionalized electrode 110 also contains bare area 140 that can be used for general electrochemistry, possible reaction with other targets, or additional functionalization.

Figure 2A:
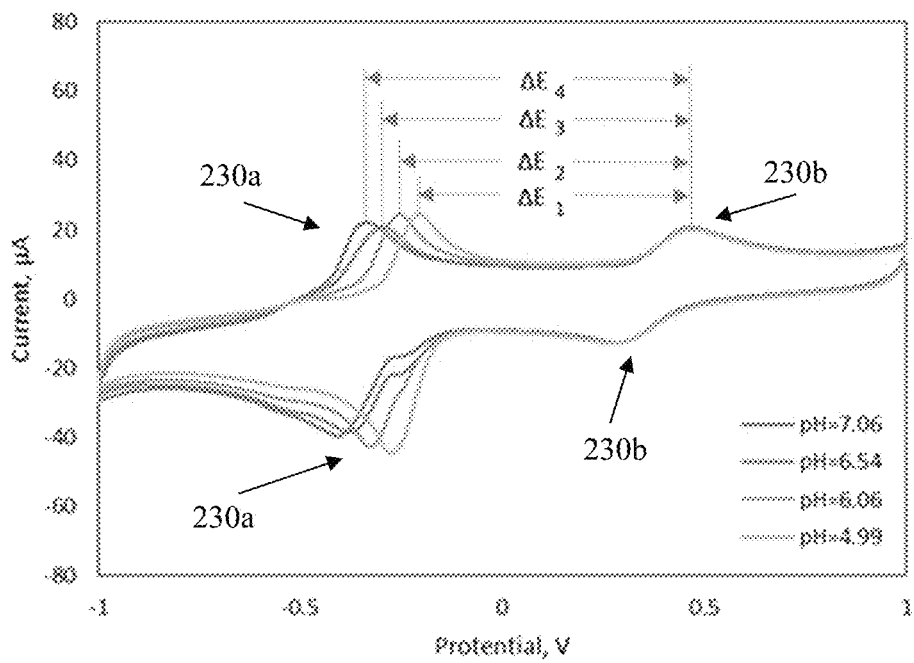
FIG. 2A illustrates overlaid voltammograms using redox molecules according to an example embodiment of the present invention.
Figure 2B:
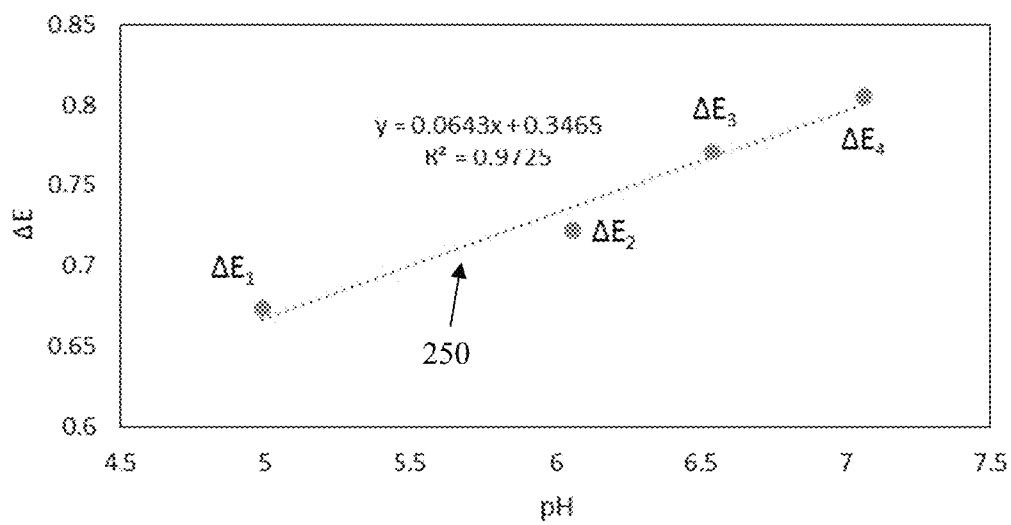
FIG. 2B illustrates a calibration curve using the voltammograms of FIG. 2A.

Both redox components 130a and 130b, whether attached to the same redox molecule or each to a different redox molecule, can have each individual redox wave shift by a different amount. In the alternative, just one of the redox components has each individual redox wave shift by a different amount, while the other component has an individual redox wave that stays the same, as illustrated in FIG. 2A. FIG. 2A shows an example of overlaid cyclic voltammograms with example data from dissolved (not bound) redox pair 9,10-anthraquinone sulfonate 230a and ferricyanide 230b. As shown, the oxidative peaks (along the top curve) and the reductive peaks (along the bottom curve) for 9,10-anthraquinonesulfonate 230a shift and are different for each of the four pH levels of 7.06, 6.54, 6.06, and 4.99, while ferricyanide 230b has the same oxidative peak and reductive peak for all pH levels.

pH sensor 100 is first calibrated by processor 102 using a known solution. In the known solution, the voltage is swept, such that redox components 130a and 130b oxidize and reduce at different voltages to generate oxidative and reductive peaks in cyclic voltammograms like FIG. 2A. The difference between the peaks (either oxidative or reductive), which is the difference in redox potential ($\Delta E$), for redox components 130a and 130b is determined by processor 102 at any number of known pH levels, but at least two pH levels are required. In FIG. 2A, the difference in redox potential for redox components 230a and 230b is shown for four pH levels: $\Delta E_1$ at a pH of 4.99, $\Delta E_2$ at a pH of 6.06, $\Delta E_3$ at a pH of 6.54, and $\Delta E_4$ at a pH of 7.06. These differences in redox potentials ($\Delta E_1$ through $\Delta E_n$) at their respective pH values are plotted (in FIG. 2B, the difference in redox potential $\Delta E$ is along the y-axis, and the pH level is along the x-axis), and a line of best fit through the plotted differences is obtained to give calibration curve 250, as illustrated in FIG. 2B. In an example, processor 102 (or another processor used in calibration phase) generates the calibration curve 250 based on the resulting electrical readings and stores the calibration curve 250 in a storage device, such as a disk or other suitably appropriate storage device, for later reference by processor 102 when determining the pH of an unknown solution using pH sensor 100. Once calibrated, pH sensor 100 and its redox components 130a and 130b can be applied to an unknown solution of unknown pH, where the voltage is swept, e.g., under control of processor 102, to generate another cyclic voltammogram with various oxidative and reductive peaks. The pH of the unknown solution is then determined by processor 102 comparing the difference in the redox potentials of redox components 130a and 130b (i.e., the difference in the peaks) to the values of the stored earlier generated calibration curve 250. Calibration curve 250 in FIG. 2B is obtained using the voltage difference between the oxidative peaks from FIG. 2A, but the voltage difference between the reductive peaks can also be used, or both could be used (i.e., oxidative peaks during the anodic scan and reductive peaks during the cathodic scan). In an example, pH sensor 100 further includes an output device, such as a display of a user terminal, to which processor 102 outputs the determined pH.

Figure 3A:
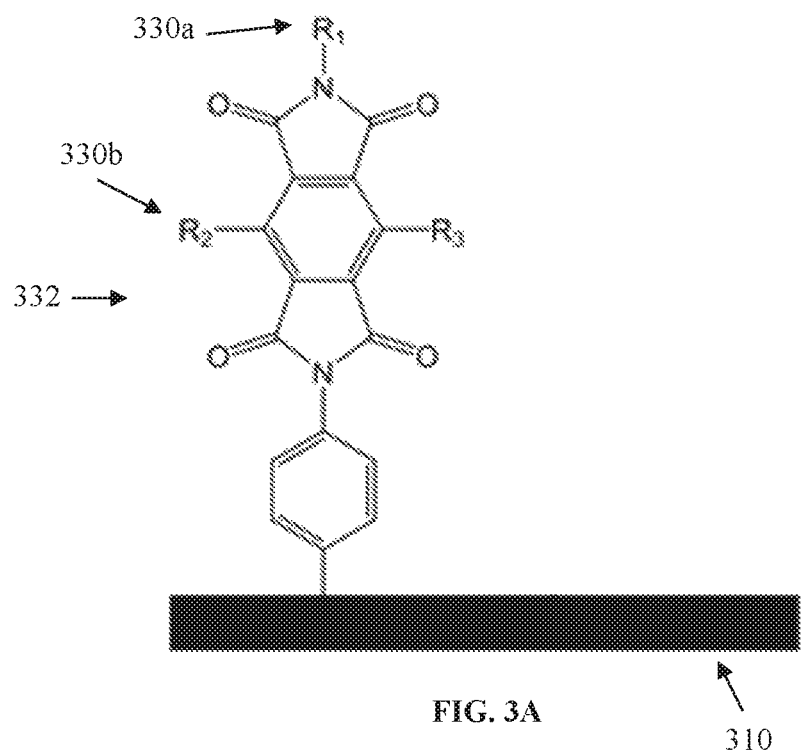
FIG. 3A illustrates a functionalized electrode according to an example embodiment of the present invention.
Figure 3B:
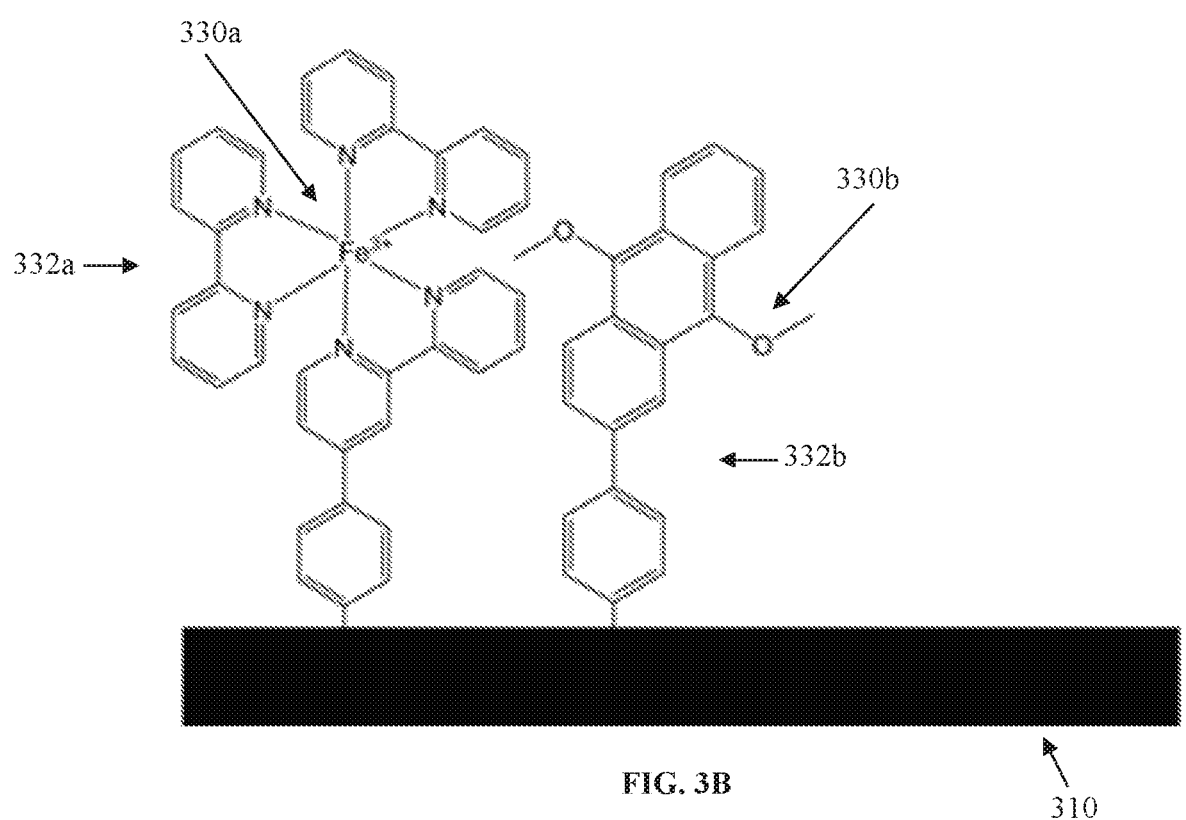
FIG. 3B illustrates a functionalized electrode according to another example embodiment of the present invention.

FIGS. 3A and 3B illustrate examples of pH sensitizers that can be used with pH sensor 100. FIG. 3A illustrates functionalizing functionalized electrode 310 with single redox active molecule 332 with multiple redox active components 330a and 330b, where functional groups $R_1$, $R_2$, and $R_3$ are parts of redox active components 330a and 330b. Through redox active components 330a and 330b, redox active molecule 332 gives rise to two separate redox waves with differing responses to pH change, where FIG. 3A specifically shows pyromelliticdiimide derived moiety 332. See Fomina et al., "An electrochemical platform for localized pH control on demand," Lab on a Chip (2016) vol. 16, 2236-44. Functional groups $R_1$, $R_2$ and $R_3$ are each different from one another, and can be H, $C_xH_{2x+1}$, Cl, F, I, Br, OM, $NO_2$, CN, OH, $OC_xH_{2x}$, $OC_xH_{2x}OH$, $O(C_xH_{2x}O)_yOH$, COOH, COOM, $SO_3H$, $SO_3M$, $NH_2$, $NHC_xH_{2x+1}$, $N(C_xH_{2x+1})_2$, $NHC_xH_{2x}OH$, $NHC_xH_{2x}NH_2$, $N(C_xH_{2x}OH)_2$, $N(C_xH_{2x}NH_2)_2$, SH, $SC_xH_{2x}$, $SC_xH_{2x}OH$, $OC_xH_{2x}SH$, $O(C_xH_{2x}O)_ySH$, sugars, peptides, or aminoacids, where M is any metal cation or $NH_4^+$, and x is from 1 to $1\times10^9$.

FIG. 3B illustrates functionalizing with two different redox active molecules 332a and 332b, each with its own redox active component 330a and 330b, respectively, that undergoes separate redox processes at different potentials, specifically showing a dual functionalization of iron (II) tris-2,2'-bipyridine derived moiety 332a and 9,10-dimethoxyanthracene derived moiety 332b.

Functional groups, like $R_1$, $R_2$ and $R_3$ in FIG. 3A, can be used to tune the properties of the sensitizing molecule 332. For example, introduction of long hydrocarbon chains improves the lipophilicity, while introduction of charged groups or atoms with lone pair electrons that can participate in hydrogen bonding improves water solubility. Such groups are, for example, hydroxyl, alkoxyl, carboxyl, sulfonyl, amino, and metaloxy. Sugars, amino acids, and peptides can also improve water solubility. Synthetic macromolecules such as polyethyleneglycoles can be used as substituents as well. The redox potentials can be tuned by introduction of electron-donating or electron-withdrawing groups. By introducing electron-donating groups (e.g., alkyl, hydroxyl, alkoxyl, methoxymethyl, morpholinomethyl, amino, and chloro substituents), redox potential can be pushed towards higher voltage. Conversely, electron-withdrawing groups (e.g., nitro, cyano, carboxylic acid, and carboxylic ester groups) will push the redox potential towards lower voltage. This is when the solution contains redox active components that may otherwise interfere with the pH measurement.

Figure 4:
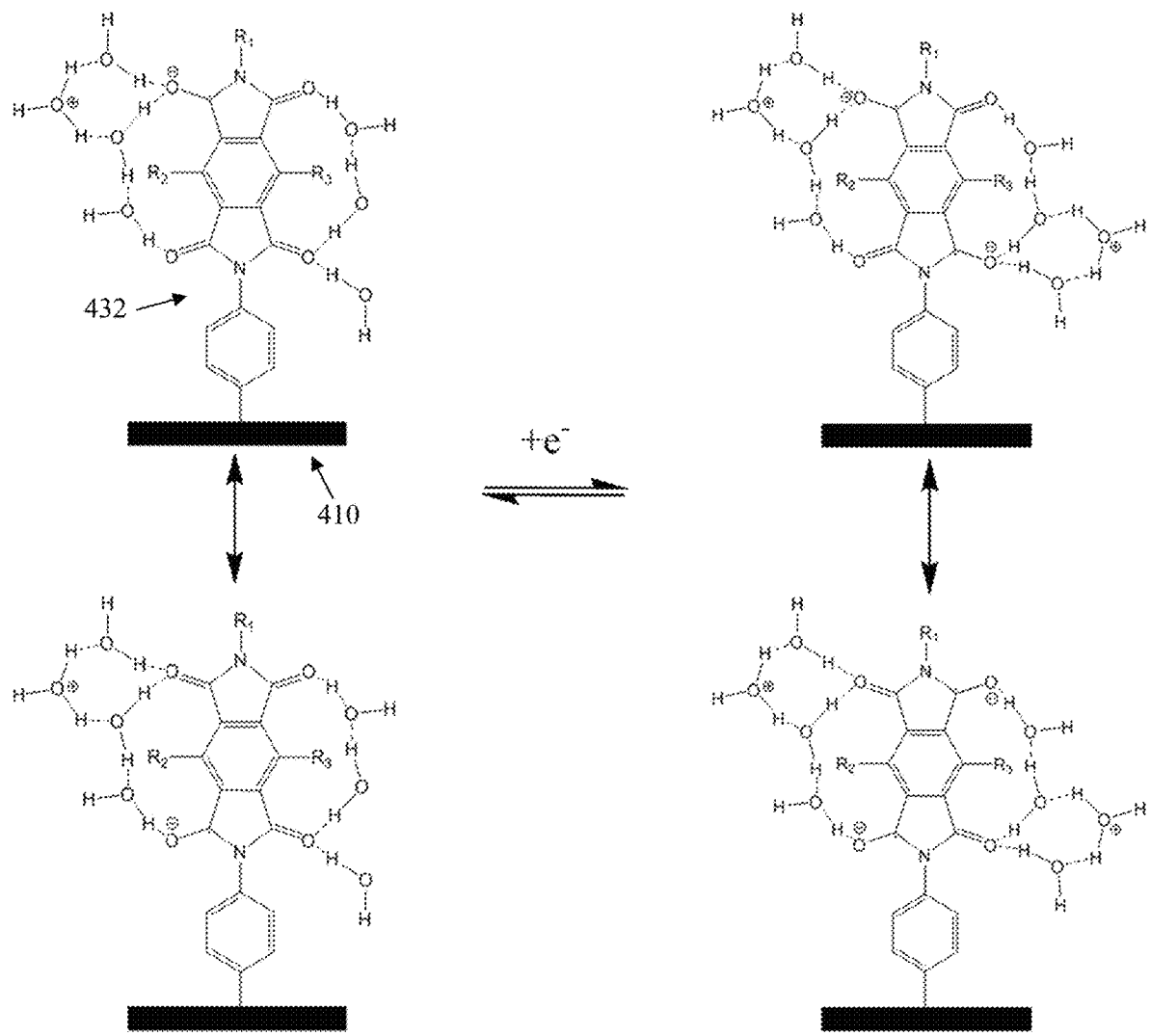
FIG. 4 illustrates a redox reaction involving a pyromelliticdiimide functionalized electrode and hydronium, according to an example embodiment of the present invention.

FIG. 4 shows redox reactions involving pyromelliticdiimide 432 functionalized electrode 410 and hydronium, illustrating how diimides can make an electrode pH sensitive and why the 1-/2-redox wave is more sensitive to pH (where pH is, essentially, the presence of hydronium or hydroxide) than the 0/1-wave. Not only do the voltages of the redox reactions change with the concentration of hydronium, but the fact that more hydronium molecules have the opportunity to strengthen the hydrogen bonds to the diimide oxygens in the dianionic state than in the monoanionic state means that the two redox reactions will change reaction potential to different extents with the same change in hydronium concentration. In other words, the presence of hydronium results in the strengthening of diimide-water hydrogen bonds, which acts to withdraw some electron density and thus stabilize excess charge on the molecule; a more negative charge on the molecule means that there is more electron density in need of stabilizing.

Figure 5A:
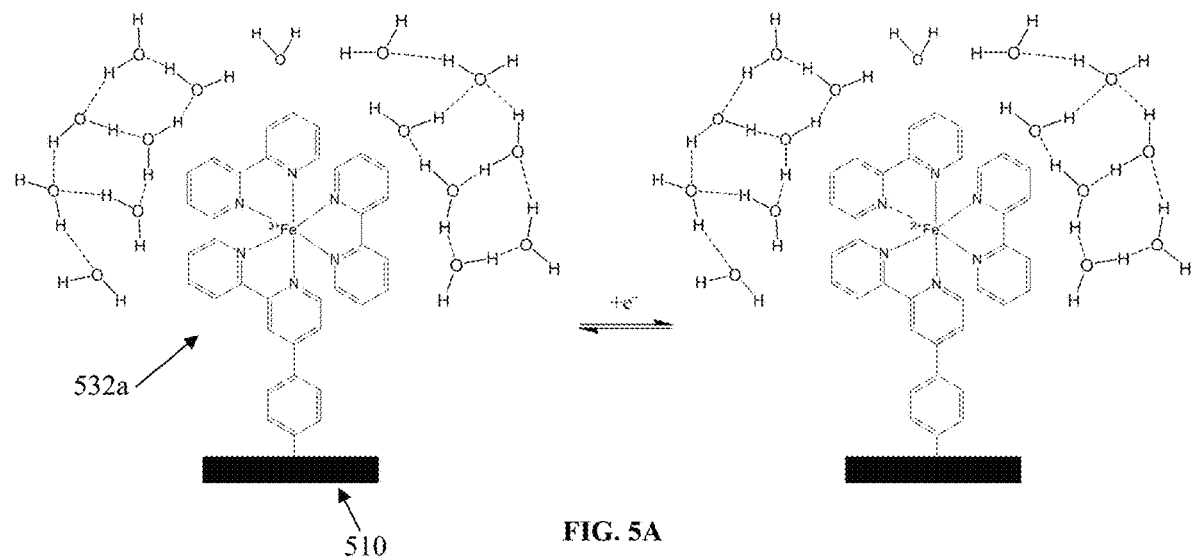
FIG. 5A illustrates a redox reaction involving iron (II) tris-2,2'-bipyridine, according to an example embodiment of the present invention.
Figure 5B:
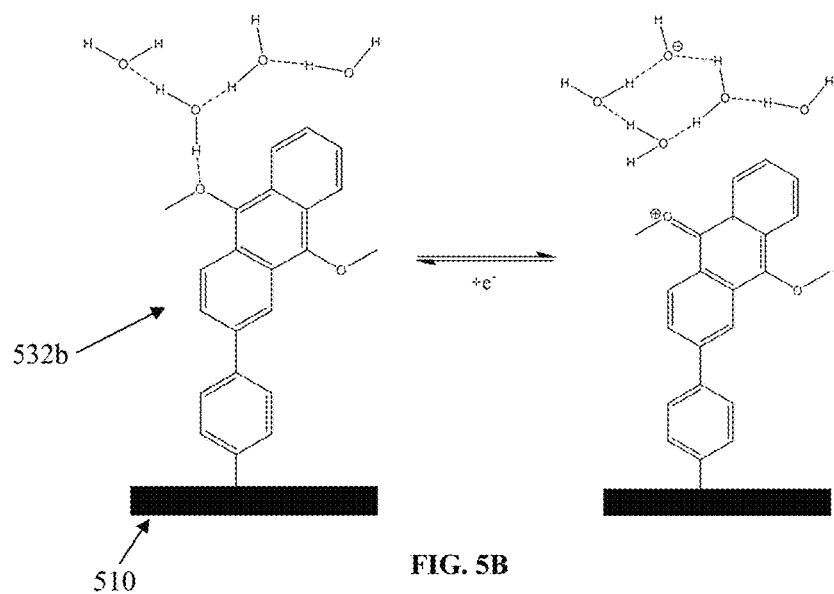
FIG. 5B illustrates a redox reaction involving 9,10-dimethoxyanthracene, according to an example embodiment of the present invention.

The combination of certain couples of molecules or components gives redox waves with different responses to hydronium or hydroxide because one of the molecules or components forms hydrogen bonds that can be strengthened or weakened by the presence of hydronium or hydroxide, while the other molecule does not. FIGS. 5A and 5B illustrate one such example with the couple 9,10-dimethoxyanthracene 532b and iron (II) tris-2,2'-bipyridine 532a on functionalized electrode 510, where 9,10-dimethoxyanthracene 532b forms hydrogen bonds that can be strengthened or weakened by the presence of hydronium or hydroxide and thus is pH sensitive (FIG. 5B), while iron (II) tris-2,2'-bi pyridine 532a does not engage in hydrogen bonding to any appreciable extent, so that its oxidation/reduction potential is insensitive to pH (FIG. 5A).

Example embodiments of the present invention are directed to one or more processors, which can be implemented using any conventional processing circuit and device or combination thereof, e.g., a Central Processing Unit (CPU) of a Personal Computer (PC) or other workstation processor, to execute code provided, e.g., on a hardware, non-transitory, computer-readable medium including any conventional memory device, to perform any of the methods, alone or in combination, to calibrate a pH sensor and/or to use a pH sensor to determine a pH, as described herein. The one or more processors can be embodied in a server or user terminal or combination thereof. The user terminal can be embodied, for example, as a desktop, laptop, hand-held device, Personal Digital Assistant (PDA), mobile telephone, smart phone, etc., or as a combination of one or more thereof. The memory device can include any conventional permanent and/or temporary memory circuits/devices or combination thereof, a non-exhaustive list of which includes Random Access Memory (RAM), Read Only Memory (ROM), Compact Disks (CD), Digital Versatile Disk (DVD), and magnetic tape. The one or more processors can alternatively be hardwired with an algorithm for performing the one or more methods.

Example embodiments of the present invention are directed to one or more hardware, non-transitory, computer-readable media, e.g., as described above, having stored thereon instructions executable by a processor to perform any of the methods, alone or in combination, to calibrate a pH sensor and/or to use a pH sensor to determine a pH, as described herein.

Example embodiments of the present invention are directed to methods, e.g., of a hardware component or machine, of transmitting instructions executable by a processor to perform any of the methods, alone or in combination, to calibrate a pH sensor and/or to use a pH sensor to determine a pH, as described herein.

Example embodiments of the present invention are directed to the execution of one or more of the methods, alone or in combination, to calibrate a pH sensor and/or to use a pH sensor to determine a pH, as described herein.

While this specification contains specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed invention may be directed to a subcombination or variation of a subcombination.

Similarly, while operations may be depicted in the drawings or described as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described components and systems can generally be integrated together in a single product or packaged into multiple products.

Thus, the above description is intended to be illustrative, and not restrictive. Those skilled in the art can appreciate from the foregoing description that the present invention may be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and the following claims.

What is claimed is:

1. A pH sensor comprising:
at least one functionalized electrode;
at least one other electrode; and
at least one redox molecule attached to the at least one functionalized electrode;
wherein:
the at least one functionalized electrode and the at least one other electrode are connected by application thereto of a solution;
the at least one redox molecule has at least a first redox potential and a second redox potential;
the first redox potential and the second redox potential are differently sensitive to pH level and oxidize at different voltages;
the at least one redox molecule produces at a same pH level a first redox reaction and a second redox reaction on the at least one functionalized electrode, each reaction having a different redox potential at the same pH level;
the first redox potential produces the first redox reaction;
the second redox potential produces the second redox reaction; and
each redox potential of the at least one redox molecule is dependent on and changes with pH level.

2. The pH sensor of claim 1, wherein the at least one functionalized electrode and the at least one other electrode are made of titanium, gold, platinum, boron doped diamond, glassy carbon, graphite, amorphous carbon, doped silicon, fluorine doped tin oxide, indium tin oxide, or a conducting polymer.

3. The pH sensor of claim 1, wherein:
the at least one redox molecule includes at least two redox molecules attached to the at least one functionalized electrode, wherein a first redox molecule of the at least two redox molecules has the first redox potential that is dependent on and changes with pH level and a second redox molecule of the at least two redox molecules has the second redox potential that is dependent on and changes with pH level.

4. A method of calibrating the pH sensor of claim 1, the method comprising:
at a first pH level, obtaining a voltammetric scan with a first peak corresponding to the first redox reaction and a first peak corresponding to the second redox reaction;
at a second pH level, obtaining a voltammetric scan with a second peak corresponding to the first redox reaction and a second peak corresponding to the second redox reaction;
plotting a first point, wherein the first point corresponds to the first pH level and a difference between the first peak corresponding to the first redox reaction and the first peak corresponding to the second redox reaction;
plotting a second point, wherein the second point corresponds to the second pH level and a difference between the second peak corresponding to the first redox reaction and the second peak corresponding to the second redox reaction; and
obtaining a line of best fit through the plotted points.

5. A method of measuring a pH level of an unknown solution using a pH sensor, wherein the pH sensor includes at least one redox molecule that has at least one redox potential that is dependent on and changes with pH level, at least one functionalized electrode to which the at least one redox molecule is attached, and at least one other electrode, wherein the at least one redox molecule produces at a pH level a first redox reaction and a second redox reaction on the at least one functionalized electrode, each reaction having a different redox potential at the same pH level, the method comprising:
applying the pH sensor to the unknown solution, thereby connecting the at least one functionalized electrode and the at least one other electrode;
obtaining at the same pH level a voltammetric scan with a peak corresponding to the first redox reaction and a peak corresponding to the second redox reaction;
finding a difference between the peak corresponding to the first redox reaction and the peak corresponding to the second redox reaction; and
finding, in a pre-determined calibration curve, the pH level corresponding to the difference between the peak corresponding to the first redox reaction and the peak corresponding to the second redox reaction;
wherein the at least one redox potential of the at least one redox molecule includes a first redox potential and a second redox potential that each is dependent on and changes with pH level, the first redox potential and the second redox potential are differently sensitive to pH level and oxidize at different voltages, the first redox potential produces the first redox reaction, and the second redox potential produces the second redox reaction.

6. The method of claim 5, wherein the peak corresponding to the first redox reaction and the peak corresponding to the second redox reaction are anodic peaks.

7. The method of claim 5, wherein the peak corresponding to the first redox reaction and the peak corresponding to the second redox reaction are cathodic peaks.

8. The method of claim 5, wherein the voltammetric scan is a linear sweep voltammogram, a cyclic voltammogram, a differential pulse voltammogram, or a square wave voltammogram.

9. The method of claim 5, wherein the at least one redox molecule includes at least two redox molecules, a first of which has the at least one redox potential that is dependent on and changes with pH level and a second of which has the second redox potential that is dependent on and changes with pH level, the first redox potential and the second redox potential are differently sensitive to pH level and oxidize at different voltages, the at least two redox molecules are attached to the at least one functionalized electrode, the first redox molecule produces the first redox reaction at the pH level on the at least one functionalized electrode, and the second redox molecule produces the second redox reaction at the same pH level on the at least one functionalized electrode.

10. The method of claim 5, wherein each redox potential of the at least one redox molecule is dependent on and changes with pH level.

11. A pH sensor comprising:
an electrode;
at least one redox molecule attached to the electrode;
a voltage source; and
a processor;
wherein:
the at least one redox molecule has at least a first redox potential that is dependent on and changes with pH level;
the at least one redox molecule produces at a pH level a first redox reaction and a second redox reaction on the electrode, each reaction having a different redox potential at the same pH level;
the processor is configured to:
apply varying amounts of voltage from the voltage source to the electrode;
obtain a voltammetric scan with a peak corresponding to the first redox reaction and a peak corresponding to the second redox reaction;
determine a difference between the peak corresponding to the first redox reaction and the peak corresponding to the second redox reaction;
identify a pH level for which a predefined calibration curve defines the difference between the peak corresponding to the first redox reaction and the peak corresponding to the second redox reaction; and
output the identified pH level to an output device; and
the at least one redox molecule additionally includes a second redox potential that is dependent on and changes with pH level, the first redox potential and the second redox potential are differently sensitive to pH level and oxidize at different voltages, the first redox potential produces the first redox reaction, and the second redox potential produces the second redox reaction.

12. The pH sensor of claim 11, wherein the at least one redox molecule includes at least two redox molecules, a first of which has the at least the first redox potential that is dependent on and changes with pH level and a second of which has the second redox potential that is dependent on and changes with pH level, the first redox molecule produces the first redox reaction at the pH level on the electrode, and the second redox molecule produces the second redox reaction at the same pH level on the electrode.

13. The pH sensor of claim 11, wherein each redox potential of the at least one redox molecule is dependent on and changes with pH level.

* * * * *